United States Patent [19]
Easton

[11] 3,903,607
[45] Sept. 9, 1975

[54] TRIGONOMETRIC COMPUTER

[76] Inventor: Wayne B. Easton, 3007 W. 96th St. Cir., Bloomington, Minn. 55431

[22] Filed: Apr. 10, 1972

[21] Appl. No.: 242,579

Related U.S. Application Data

[63] Continuation-in-part of Ser. No. 10,384, Feb. 11, 1970, abandoned.

[52] U.S. Cl. .............................................. 33/76 R
[51] Int. Cl. ............................................ G06g 1/00
[58] Field of Search .............. 33/1 R, 1 B, 1 C, 1 M, 33/1 SB, 1 SD, 93, 95, 99, 76 R; 235/61 GM; 35/34

[56] References Cited
UNITED STATES PATENTS

| | | | |
|---|---|---|---|
| 378,257 | 2/1888 | Leschorn | 33/76 VA X |
| 1,376,098 | 4/1921 | Jones | 33/76 R |
| 1,955,392 | 4/1934 | Shimberg | 33/76 R |
| 2,701,096 | 2/1955 | Wattier | 235/6 GM |
| 3,083,901 | 4/1963 | Gabriel | 35/34 UX |
| 3,414,190 | 12/1968 | Lemiese | 235/61 GM |

FOREIGN PATENTS OR APPLICATIONS

| | | | |
|---|---|---|---|
| 1,036,904 | 9/1953 | France | 235/61 GM |

*Primary Examiner*—Edward J. McCarthy

[57] ABSTRACT

The computer has a plastic surface of a type which will receive easily eraseable pencil marks. A T-square having a hairline aligned with a slot in the T-square is used for plotting two intersecting lines, which completely defines a right triangle with regard to length of the hypotenuse and the angle the hypotenuse makes with the adjacent horizontal leg of the triangle. Two important advantages which result from this combination are (1) the high degree of accuracy achieved by defining a point with crossed lines and (2) the T-square does not have to be used as a measuring ruler and hence does not have to be provided with scaling indicia.

5 Claims, 8 Drawing Figures

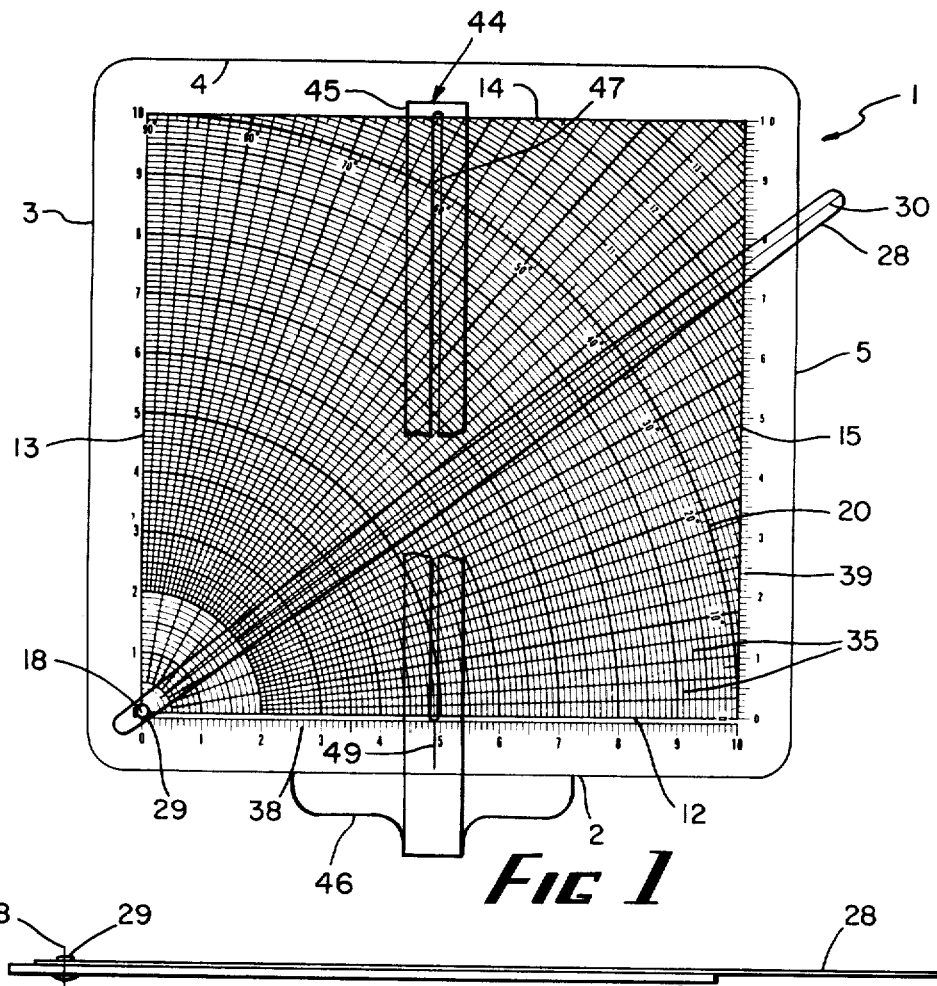
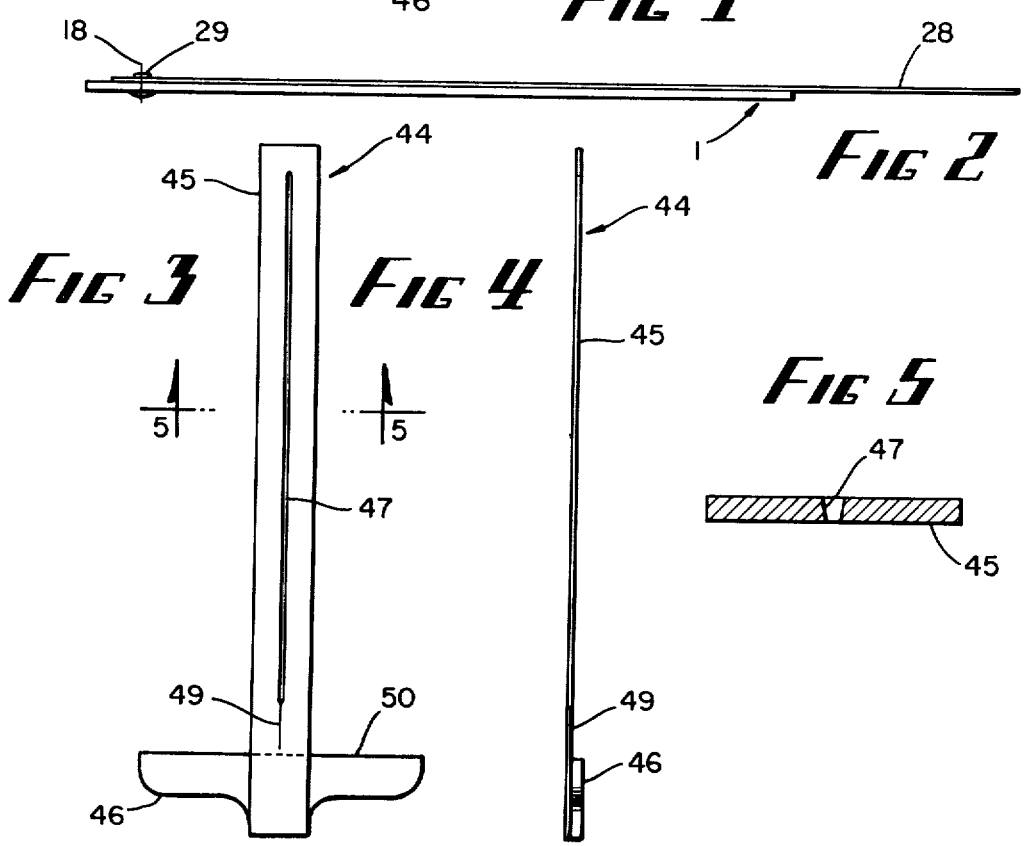

PATENTED SEP 9 1975 3,903,607

TRIGONOMETRIC COMPUTER

This application is a continuation-in-part of application Ser. No. 10,384 filed Feb. 11, 1970, abandoned.

The invention relates to a trigonometric computer for graphically calculating the unknown angles and lengths of sides of right triangles from given or known angles and sides.

The calculations involved in computing unknown sides and angles of right triangles with the use of a slide rule require a number of settings and readings which are both time consuming and tedious. Such slide rule calculations are also sufficiently complex that mistakes can be easily made if a reasonable amount of care is not exercised.

The operation of a trigonometric computer embodying the present invention is both graphic and simple in nature. The solving of the problem of determining the length of a hypotenuse and its angle when the lengths of the other two sides are known only involves three settings and two readings and this only takes a few seconds of time. The same problem worked with a slide rule, on the other hand, involves five settings and four readings and requires several minutes of time. In addition, the slide rule method is not graphic in nature and the operator is thus not likely to realize that answers he arrives at might contain substantial errors.

A main object of the invention is to provide a new and improved trigonometric computer for obtaining graphic trigonometric solutions for right triangles. A further object of the invention is to provide such a computer having as a part thereof a novel T-square type of device which is instrumental in plotting analogs of triangles having unknown sides or angles.

Other objects and features of the invention will become apparent by reference to the following specification and to the drawings.

In the drawing:

FIG. 1 is a plan view of the trigonometric computer device embodying the present invention shown with a pointer element pivotally attached thereto;

FIG. 2 is a side view, viewed from the bottom side, of the assembly shown in FIG. 1 except for the T-square;

FIG. 3 is a plan view of the T-square of the trigonometric computing device;

FIG. 4 is a side view of the T-square shown in FIG. 3;

FIG. 5 is a sectional view on an enlarged scale taken on line 5—5 of FIG. 3.

Figure 6:
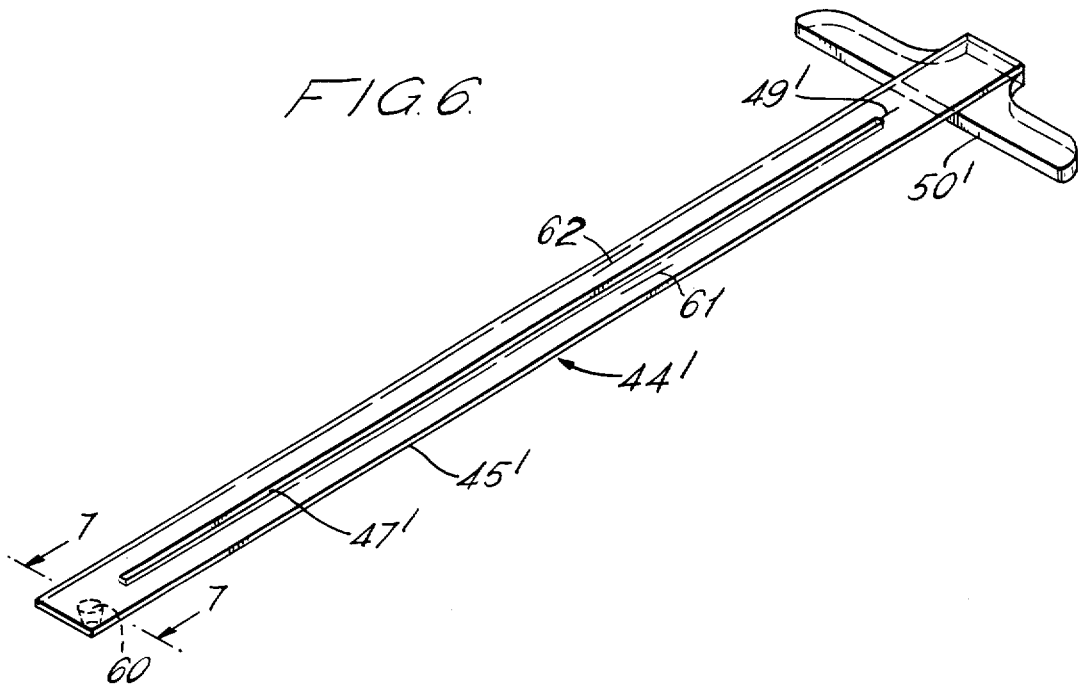
FIG. 6 is a perspective view of a modified form of T-square which is usable with the base plate element 1 shown in FIG. 1 without the pointer 28 thereof.

Referring to the drawings, there is shown in FIGS. 1 and 2 a rectangularly shaped base plate element 1 having sides 2 to 5 and being formed of a plastic material or the like which has a thickness sufficient to provide a relatively substantial degree of rigidity. The top side or face of the base plate element is flat or planar and has a format imprinted, impressed or otherwise designated thereon. The format includes a square border having sides 12 to 15 which are respectively parallel to and extend in spaced relation to base plate sides 2 to 5. Border sides 12 and 13 are in effect a pair of orthogonal axes which intersect at a point 18 in the lower left side corner thereof.

Linearly graduated angular scale means 20 is indicated on the base plate element 1 as an arc shaped scale which extends between the orthogonal axes 12 and 13 and has a range from 0° to 90°. The arc of the angular scale means 20 has its center at the point 18 and the arc is illustrated as being graduated or divided into single degree units.

An elongated pointer element 28 is mounted on and pivotally attached to the base plate element 1 by means of a rivet 29 or the like to facilitate pivotal movement of the pointer about and relative to the the point or arc center 18. The material for pointer element 28 may be a transparent plastic and a hair line 30 is printed or scribed on the underneath side thereof for cooperation with the angular scale means 20 to indicate angular positions of the pointer element 28 relative to the orthogonal axes 12 and 13. The upper surface of pointer element 28 may have a matte finish so that pencil marks may be indicated thereon for a purpose which will be described further on herein.

Orthogonal axes 12 and 13 and oppositely disposed border lines 14 and 15 combine to form a square border within which radial scale means 35 is provided on the face of base plate element 1. The function of radial scale means 35 is to indicate radial distances of points within the square border from the point or center 18. As illustrated herein, radial scale means 35 comprises a plurality of equally spaced arc lines 35 concentrically disposed relative to the point 18 on base plate element 1 with the ends of individual arc lines 35 being defined by, or terminating at, the border sides 12 to 15. The ends of the arc lines 35 bordered by the axes 12 and 13 register with and are aligned with the division lines of a scale 38 indicated along the horizontal axis 12. The larger scale units of the arc lines 35, bordered by the border lines 14 and 15, are indicated by the numerals 11, 12 and 13 which appear between the radial 44° and 46° lines in the vicinity of the upper right hand corner of the base plate.

Orthogonal axis 12 has the linearly graduated horizontal scale 38 associated therewith which is graduated in to 10 large scale units and 100 small scale units. Vertically extending border side 15 has a vertical scale 39 associated therewith which is identical to scale 38 being likewise graduated into 10 large scale units and 100 small scale units. It is essential within the scope of the illustrated embodiment of the invention that the edges 2 and 5 of the base plate be parallel respectively with the border lines 12 and 15 with which the scales 38 and 39 are associated.

The top surface of base plate element 1 upon which the scales 20, 35, 38 and 39 appear is of a nature such that pencil dots or lines thereon can be readily removed with an eraser or a damp cloth so that an accumulation of marks will not create confusion. Plastic in sheet form having a matte finish provides a satisfactory material and surface for this purpose.

From the standpoint of reversibility of parts, means equivalent to the graduated angular scale means 20 could be provided on the pointer element 28 instead of on the base plate element 1 to indicate angular positions of the pointer element relative to the orthogonal axes 12 and 13. Likewise, means equivalent to the radial scale means 35 could also be provided on the pointer element 28 instead of on the base plate element 1 to indicate radial distances of any point on the base plate element 1 from the point or arc center 18.

Referring to FIGS. 3 to 5, there is shown a T-square 44 having a vertically extending ruler member 45 attached to a horizontally extending crosspiece member 46. In the illustrated embodiment of the invention the T-square 44 is made of a clear plastic material or the like. Ruler member 45 has a centrally disposed, longitudinally extending slot 47 having downwardly converging bevelled sides as shown most clearly in FIG. 5. A vertically extending hairline 49 on the underneath side of ruler 45 extends downwardly from the center of the bottom of slot 47.

Crosspiece 46 has a straight edge 50 which is adapted for abutting and sliding engagement with the horizontal and vertical edges 2 and 5 of base plate element 1. When the T-square edge 50 engages base plate edge 2, the edges of the T-square slot 47 are perpendicular to horizontal axis 12 and hairline 49 cooperates with base plate scale 38 to facilitate the horizontal positioning of slot 47 relative to scale 38. Bevelled slot 47 is dimensioned with regard to the width thereof so that a pencil point may be inserted therethrough to apply a vertically extending line on the base plate surface which is in vertical alignment with the hairline 49. The width of slot 47 is thus just sufficient to allow the entry of a pencil point so that precise vertical alignment is achieved between the pencil line and the scale 38.

In a similar manner T-square edge 50 cooperates with base plate edge 5 to effect the vertical positioning of slot 47 relative to scale 39. A horizontally extending line may be drawn through the slot onto the base plate which intersects a previously drawn vertically extending line, as referred to above, and the point of intersection in effect defines or determines the length and angle of the hypotenuse of a triangle.

The mode of operation of the computer device will now be described with the use of specific examples.

A first example involves a right triangle in which the lengths of the sides adjacent the 90 degree angle are given and it is desired to determine the length of the hypotenuse and the angle the hypotenuse makes with one of the sides. If the given horizontal and vertical lengths of the sides are 4.32 and 3.21 units respectively, the T-square is positioned so that the hairline 49 thereof registers with the 4.32 point of the horizontal scale 38, and a short vertical pencil line is applied to the base plate surface through the T-square slot 47 which may extend approximately between the 3 and 4 graduation marks of vertical scale 39. The T-square is then positioned so that its hairline 49 registers with the 3.21 point of the vertical scale 39 and a short horizontal line is applied to the base plate surface through the slot 47 which intersects the previously drawn vertical line. The point of intersection between the horizontally and vertically extending pencil lines is a reference point which identifies or defines the hypotenuse. The user may identify this point numerically by reference to scales 20 and 38. The length of the hypotenuse is read, with reference to the base plate scales 35 and 38, as being 5.37 units. The hairline 30 of pointer 28 is moved to register with this reference point to enable the angle 36.7° to be read with reference to base plate angular scale 20.

The opposite problem where the length and angle of the hypotenuse is given and it is desired to find the lengths of the two sides adjacent the right angle may also be solved with the computer device. If the given length of the hypotenuse is 5 units at an angle of 30°, the top surface of the pointer 28 is marked, with reference to scake 38, with a pencil dot at the 5 unit mark along the hairline 30. The pointer is then moved so that the hairline 30 registers with the 30 degree mark on the base plate scale 20. Using the T-square with the horizontal and vertical scales 38 and 39 so that the slot 27 straddles the pencil dot on the pointer 28, the vertical leg of the triangle can be read as being 2.50 units on the base plate scale 39 and the horizontal leg of the triangle can be read as being 4.38 units on the base plate scale 38.

Figure 7:
FIG. 7 is a sectional view taken on line 7—7 of FIG. 6.
Figure 8:
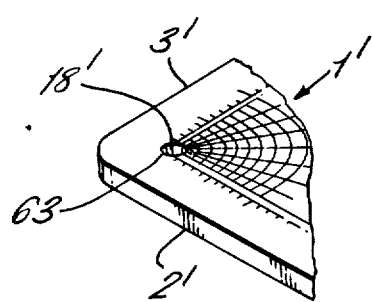
FIG. 8 is a fragmentary perspective view shown on a corner of the base plate element 1 modified to have an eyelet instead of the pointer and rivet construction.

Another embodiment or modification of the invention is illustrated in FIGS. 6 to 8. The T-square 44' shown in FIG. 6 differs from the T-square 44 of FIG. 3 in the respects that (1) the ruler part 45' is approximately one-third longer, (2) the ruler part 45' has a downwardly extending frustoconically shaped pivot pin or pintle 60 at the opposite end from cross piece 50; and (3) the ruler part 45' has hairlines 61 and 62 which straddle the slot 47' and are radially extending relative to the axis of the pintle 60.

FIG. 8 shows a corner of a base plate element 1' which corresponds exactly to the base plate 1 of FIG. 1 except that the pointer and rivet construction is replaced by an eyelet 63 which has an axis or center 18'.

With regard to the change of the mode of operation with the modified T-square 44', the pointer 28 is eliminated. The pintle 60 is receivable in the base plate eyelet 63 so that the T-square 44' may be angularly moved in pointer fashion relative to the base plate axis 18'. Radially extending pencil lines may be applied to the base plate through the T-square slot 47'. The hairlines 60 and 61 would be in the vicinity of a base plate angular scale such as the angular scale 20 of the base plate 1. The purpose or function of the hairlines 60 and 61 is to position the slot 47' and to permit a position of the slot 47' to be read. If, for example, it is desired to position the slot at 28° the hairline 60 would be aligned at 29°, or the hairline 61 aligned at 27°. The hairlines 60 and 61 will provide the greatest utility if they are extended radially outwardly to intersect the sides of the ruler part 45' and radially inwardly to intersect the sides of the slot 47'.

I claim:

1. A device for computing sides and angles of right triangles, comprising, a base plate element having a planar surface, intersecting orthogonal axes indicated on said surface, said base plate element having two edges thereof in parallel relation respectively with said axes, graduated angular scale means on said base plate having a range from zero to 90 degrees for indicating angles between said axes and having a center which coincides with the intersection of said axes, radial scale means on said base plate for indicating radial distances of points on said planar surface from said center, horizontal and vertical linearly graduated scale means on said base plate extending respectively between said axes and said edges, each of said scale means having a range from 0 to a predetermined number, a T-square for drawing lines on said planar surface comprising a ruler and a crosspiece at one end of said ruler, a longitudinally extending slot in said ruler through which said lines are drawn, a hairline on said ruler aligned with said slot, said hairline being between said slot and said crosspiece, said crosspiece being cooperable with said two base plate edges and said hairline being cooperable with said horizontal and vertical scale means for selectively positioning said T-square relative to said horizontal and vertical scales.

2. A device for computing sides and angles of right triangles according to claim 1 including a pointer element pivotally mounted on said base plate at said center and being cooperable with said angular scale means.

3. A device according to claim 1 wherein said ruler has a pintle at the end thereof opposite said cross piece, said base plate having a centering opening coincident with the intersection of said orthogonal axes for receiving said pintle.

4. A device according to claim 3 including indicia on said ruler extending radially relative to the axis of said pintle and in angularly spaced relation to the centerline of said slot.

5. A device for computing sides and angles of right triangles according to claim 1 wherein said surface is adapted to receive eraseable pencil marks thereon.

* * * * *